United States Patent
Mao

(10) Patent No.: US 7,536,490 B2
(45) Date of Patent: May 19, 2009

(54) METHOD FOR LINK BANDWIDTH MANAGEMENT

(75) Inventor: Jin-Liang Mao, Fremont, CA (US)

(73) Assignee: Via Technologies, Inc., Hsin-Tien (TW)

( * ) Notice: Subject to any disclaimer, the term of this patent is extended or adjusted under 35 U.S.C. 154(b) by 120 days.

(21) Appl. No.: 11/490,349

(22) Filed: Jul. 20, 2006

(65) Prior Publication Data

US 2008/0022024 A1 Jan. 24, 2008

(51) Int. Cl.
*G06F 13/00* (2006.01)
*G06F 13/40* (2006.01)

(52) U.S. Cl. ...................... 710/104; 710/307
(58) Field of Classification Search .............. 710/104, 710/307
See application file for complete search history.

(56) References Cited

U.S. PATENT DOCUMENTS

| | | | | |
|---|---|---|---|---|
| 5,613,078 | A * | 3/1997 | Kishigami | 710/307 |
| 6,018,810 | A * | 1/2000 | Olarig | 714/43 |
| 6,611,891 | B1 * | 8/2003 | Hewitt et al. | 710/306 |
| 6,952,746 | B2 * | 10/2005 | Capps et al. | 710/104 |
| 7,099,969 | B2 * | 8/2006 | McAfee et al. | 710/107 |
| 7,136,953 | B1 * | 11/2006 | Bisson et al. | 710/307 |
| 7,162,554 | B1 * | 1/2007 | Cole et al. | 710/104 |
| 7,174,411 | B1 * | 2/2007 | Ngai | 710/316 |
| 7,197,591 | B2 * | 3/2007 | Kwa et al. | 710/307 |
| 7,308,514 | B1 * | 12/2007 | Hewitt et al. | 710/66 |
| 7,366,816 | B2 * | 4/2008 | Rai | 710/307 |
| 2005/0119860 | A1 * | 6/2005 | Hsu et al. | 702/186 |
| 2005/0283561 | A1 * | 12/2005 | Lee et al. | 710/307 |
| 2006/0271713 | A1 * | 11/2006 | Xie et al. | 710/100 |

(Continued)

FOREIGN PATENT DOCUMENTS

EP 359233 A2 * 3/1990

(Continued)

OTHER PUBLICATIONS

"Bus", Microsoft Computer Dictionary, 2002, Microsoft Corporation, Fifth Edition, p. 77.*

(Continued)

*Primary Examiner*—Mark Rinehart
*Assistant Examiner*—Faisal M Zaman
(74) *Attorney, Agent, or Firm*—Kirton & McConkie; Evan R. Witt

(57) ABSTRACT

A method for link bandwidth management between two devices in communication through a bandwidth-adjustable bus in a computer system determines which of a speed negotiation priority and a width negotiation priority is higher when the change condition is activated. An original width of the bus is changed to a target width first while remaining an original speed of the bus unchanged when the width negotiation priority is higher, and then optionally changing the original speed to a target speed. On the other hand, an original speed of the bus is changed to the target speed first while remaining the original width of the bus unchanged when the speed negotiation priority is higher, and then optionally changing the original width to the target width. The bus operates at a target bandwidth with the target width and the target speed without disabling the link state or powering down the computer system.

6 Claims, 6 Drawing Sheets

U.S. PATENT DOCUMENTS

| | | | |
|---|---|---|---|
| 2007/0094436 A1* | 4/2007 | Keown et al. | 710/307 |
| 2007/0094437 A1* | 4/2007 | Jabori et al. | 710/307 |
| 2007/0233926 A1* | 10/2007 | Chang | 710/301 |
| 2007/0233930 A1* | 10/2007 | Gallagher et al. | 710/307 |
| 2007/0276981 A1* | 11/2007 | Atherton et al. | 710/307 |

FOREIGN PATENT DOCUMENTS

| | | | |
|---|---|---|---|
| JP | 57174723 A | * | 10/1982 |
| JP | 03010355 A | * | 1/1991 |
| JP | 11250006 A | * | 9/1999 |
| JP | 2000020462 A | * | 1/2000 |
| JP | 2007159105 A | * | 6/2007 |
| WO | WO 9822877 A1 | * | 5/1998 |

OTHER PUBLICATIONS

"PCI Express Base Specification", Revision 1.1, Mar. 28, 2005, PCI Special Interest Group, pp. 169-170.*

Antonopoulos, C.D.; Nikolopoulos, D.S.; Papatheodorou, T.S., "Scheduling algorithms with bus bandwidth considerations for SMPs," Parallel Processing, 2003. Proceedings. 2003 International Conference on , vol., No., pp. 547-554, 9-9 Oct. 2003.*

Sharony, J.; Sen, M., "Bandwidth management in 802.11 wireless LANs," Communications, 2004 IEEE International Conference on , vol. 7, No., pp. 3837-3843 vol. 7, Jun. 20-24, 2004.*

Anonymous, "PCI Express: Connectivity for the Next Generation", Jan. 2006, West World Publications, vol. 26 Issue 1, p. 19.*

Betts, Brian, "PCI Express and USB 2.0 Improve Peformance of PC-based measurements", Sep. 29, 2005, EDN, vol. 50 Iss. 20, pp. 89, 90, 92.*

* cited by examiner

METHOD FOR LINK BANDWIDTH MANAGEMENT

FIELD OF THE INVENTION

The present invention relates to a method for link bandwidth management, and more particularly to a method for link bandwidth management applied to a PCI express bus.

BACKGROUND OF THE INVENTION

As shown in FIG. 1, it is a computer system architecture. In a modern computer system, CPU 20, memory 22, and graphic chip 24 work very closely and they need to have faster data access to each other. As a result, requests and responses issued from the three devices are all controlled and managed by the north bridge chip 26. The north bridge chip 26 is tied to the south bridge chip 28, which routes traffic from the different I/O devices on the system, such as hard disk drive 30, optical disk drive 32, and ethernet port 34. The traffic from these devices is routed through the south bridge chip 28 to the north bridge chip 26 and then onto the CPU and/or memory 22.

In 2002, a new PCI express bus specification was finished and then a PCI express bus 40 communicated between the graphic chip 24 and the north bridge chip 26 was implemented in the computer system. Generally speaking, a connection between a graphic chip 24 and the north bridge chip 26 on a PCI express bus 40 is called a link. Each link is composed of one or more lanes, and each lane is capable of transmitting one byte at a time in both directions. That means each lane is itself composed of one pair of signals: send and receive. In order to transmit PCI express packets, which are composed of multiple bytes, one device using a one-lane link on the transmitting end must break down each packet into a series of bytes, and then transmit the bytes in rapid succession. The device on the receiving end has to collect all of the bytes and then reassemble them into the original packet.

One of PCI express bus 40 features is the ability to aggregate multiple individual lanes together to form a signal link. In other words, two lanes could be coupled together to form a single link capable of transmitting two bytes at a time, this doubling the link bandwidth. Also, four lanes, or eight lanes could be combined to form a single link. A link composes of a single lane is called an x1 link; a link composed of two lanes is called x2 link; a link composed of four lanes is called x4 link, etc. PCI express bus 40 supports x1, x2, x4, x8, x12, x16, and x32 link widths. Furthermore, PCI express bus supports two different link speeds. One is called PCI express generation 1 (Gen 1) having a clock data rate of 2.5 GHz, and the other is called PCI express generation 2 (Gen 2) having a clock data rate of 5 GHz.

As depicted in FIG. 2, it is a conventional method for devices connecting to a PCI express bus to negotiate a link width/speed. Conventionally, link width/speed is reset when link is down or initial power up. The first state is called link down state or initial power up state 50, which is set at the time of powering up the computer system. Then, the state changes to set maximum link width/speed state 52, which is activated by two devices connected by the PCI express bus. In the state 52, two devices individually set the maximum link widths/speeds they support for transmitting and receiving data through the bus. Then, the state changes to negotiate maximum allowed link width/speed state 54. In state 54, two devices negotiate an allowed maximum link width/speed according to the physical layer electrical characteristic, and channel features of both devices. For example, in state 52, the respective maximum link bandwidths of graphic chip and north bridge chip are x32/Gen1 and x16/Gen2. After negotiation process of state 54, the maximum allowed link width/speed of PCI express bus is x16/Gen1. After the maximum allowed link width/speed is determined, there is generally also device initiation/configuration state 56 for devices to be useful in a real application. After state 56, it goes to link normal operation state 58, which means the maximum allowed link bandwidth is the final operation bandwidth for the two devices to communicate normally with each other.

According to FIG. 2, to change link width/speed, it should disable the link or power down the computer system for the state to go from link normal operation state 58, through link down/initial power up state 50, set maximum link width/speed state 52 negotiate maximum allowed width/speed state 54, then to device initiation/configuration state 56. Since the execution of link down/initial power up state 50 and device initial/configuration state 56 to change link width/speed is complicated and time consuming. In real practice, the maximum allowed speed/width is always set for all applications. In other words, link bandwidth never changes, and there is no bandwidth management needed in the prior art. In other cases, the final operation bandwidth is always the maximum allowed link width/speed even if the link bandwidth is to be changed. Moreover, for bandwidth eager applications, e.g. 3D game software, the preset bandwidth may be too small; and for applications with few packets traffic, e.g. document software, the preset bandwidth is often too luxury for them, which in most cases means power waste.

SUMMARY OF THE INVENTION

The present invention provides a method for link bandwidth management targeted to achieve both good performance and high power efficiency for any specific application and to have a fast link bandwidth change for ameliorating the above-mentioned defects of conventional technology.

In accordance with an aspect of the present invention, a method for link bandwidth management between two devices in communication through a bandwidth-adjustable bus in a computer system includes: monitoring whether a change condition of the bus having a link is activated; determining which of a speed negotiation priority and a width negotiation priority is higher when the change condition is activated; changing an original width of the bus to a target width first while remaining an original speed of the bus unchanged when the width negotiation priority is higher, and then optionally changing the original speed to a target speed; changing the original speed of the bus to the target speed first while remaining the original width of the bus unchanged when the speed negotiation priority is higher, and then optionally changing the original width to the target width; and causing the bus to operate at a target bandwidth with the target width and the target speed without disabling the link or powering down the computer system.

In accordance with another aspect of the present invention, a method for link bandwidth management between two devices in communication through a bandwidth-adjustable bus in a computer system includes: monitoring whether a change condition of the bus having a link is activated; changing a bandwidth of the bus from a first bandwidth with a first width and a first speed to a target bandwidth with a second width and the first speed or with the first width and a second speed when the change condition of the bus is activated, and causing the bus to operate at the target bandwidth without disabling the link or powering down the computer system; and causing the bus to remain operating at the first bandwidth and recording the target bandwidth as an unattainable bandwidth if the bus has failed to operate at the target bandwidth.

In accordance with a further aspect of the present invention, a method for link bandwidth management between two devices in communication through a bandwidth-adjustable bus in a computer system includes monitoring whether a change condition of the bus having a link is activated; changing a bandwidth of the bus from a first bandwidth with a first width and a first speed to a target bandwidth with a second width and the first speed or with the first width and a second speed when the change condition of the bus is activated, and causing the bus to operate at the target bandwidth without disabling the link or powering down the computer system; and causing the bus to remain operating at the first bandwidth and recording the target bandwidth as an unattainable bandwidth if the bus operates at the target bandwidth but the target bandwidth is unreliable.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
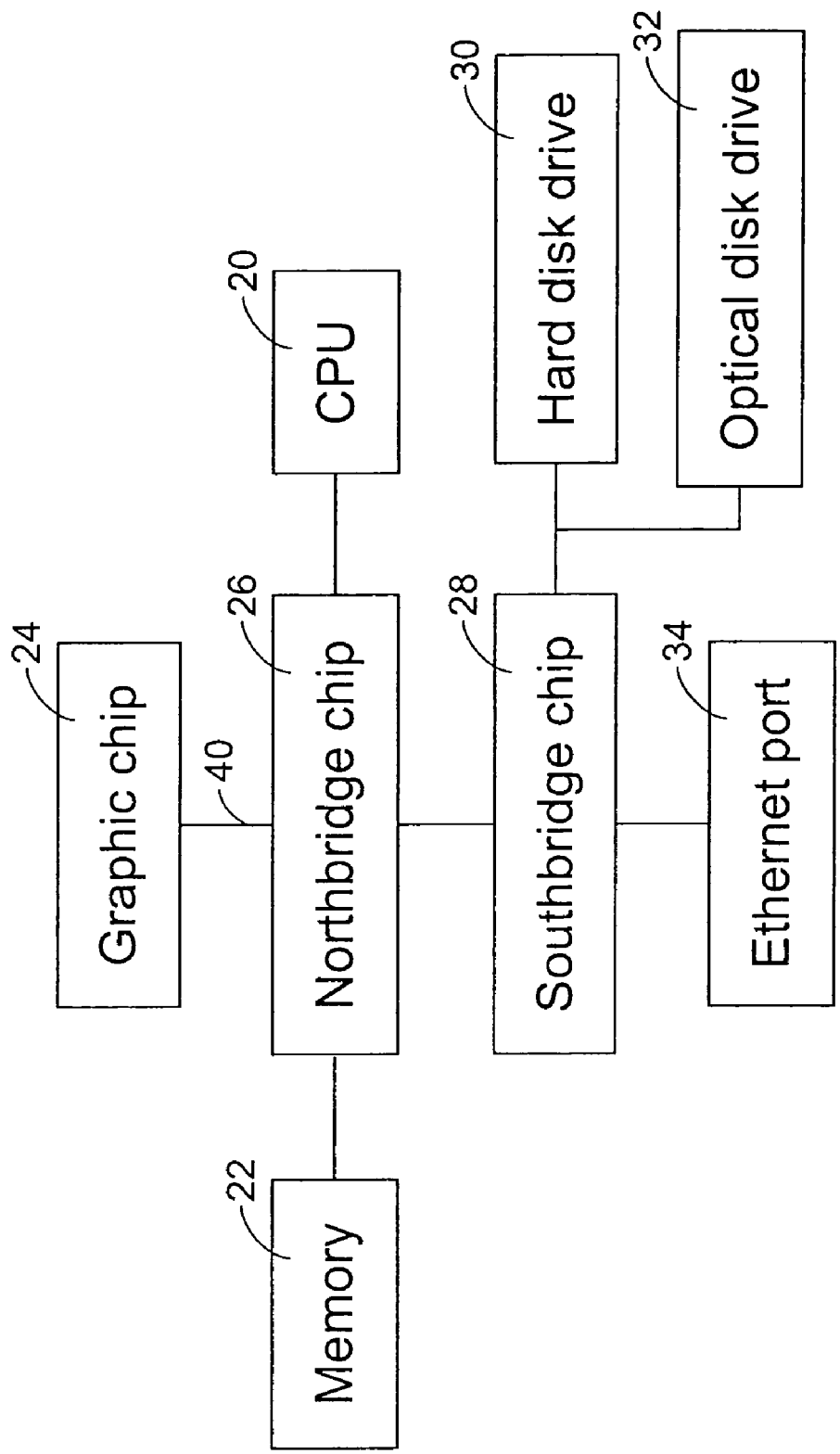
FIG. 1 schematically shows a computer system architecture.
Figure 2:
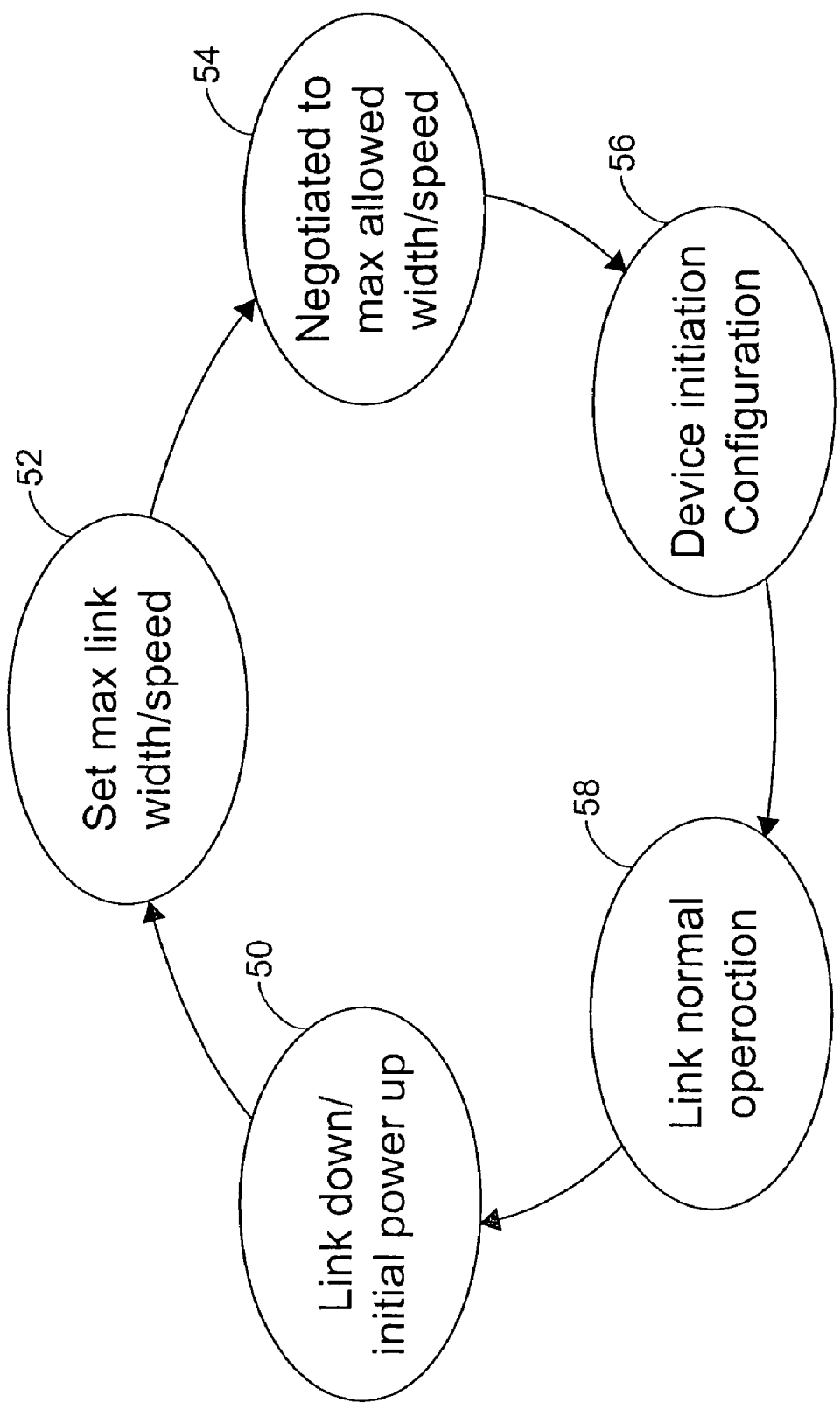
FIG. 2 is a scheme illustrating a conventional link width/speed negotiation sequence.
Figure 3:
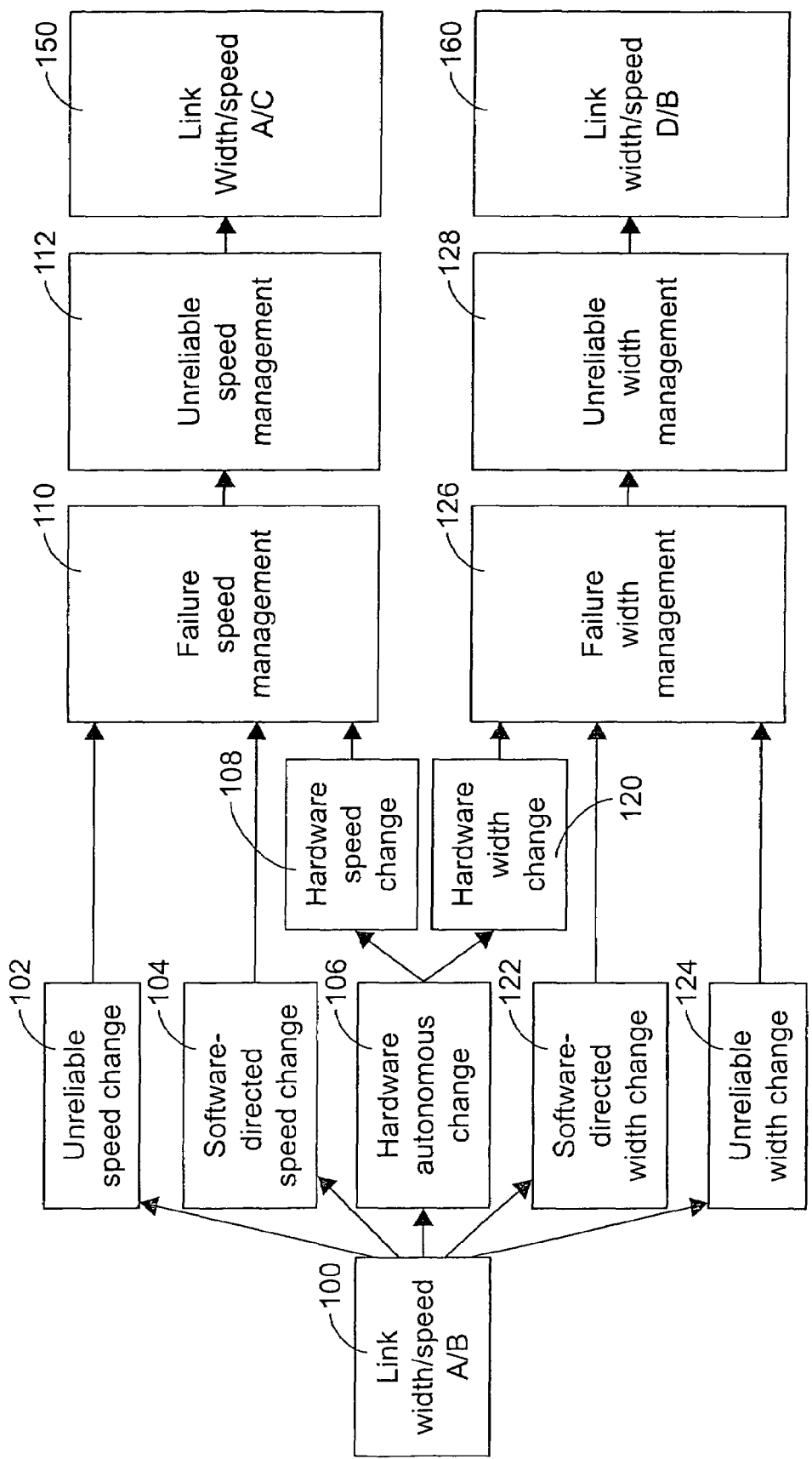
FIG. 3 is a block diagram schematically illustrating a link bandwidth management sequence of according to an embodiment of the present invention.

As depicted in FIG. 3, it is an embodiment of link bandwidth management a PCI express bus according to the present invention. In the embodiment, the PCI express bus changes link width/speed when a change condition is activated. The change condition according to the invention can be a hardware autonomous change, a software-directed change, or an unreliable change; and each change includes link width change and link speed change.

As depicted in FIG. 3, the software-directed change includes software-directed speed change 104 and software-directed width change 122. When a computer system is executing a software application, the software application stores a required link width/speed for the PCI express bus in a register of a north bridge chip. The link width/speed need to be changed if the link width/speed stored in the register is different from the present link width/speed. For example, if the initial link width/speed of the PCI express bus is link A/B 100, and the link width/speed stored in a register by a software application is link A/C, the software-directed speed change 104 will be executed. Link speed B will be changed to link speed C as a result of negotiation between two ends of the bus (North bride and Graphic Chip). Once the target link speed C passes subsequent failure speed management 110 and unreliable speed management 112, the link width/speed of the PCI express bus will finally change to link A/C 150, and the link is supposed to attain target link speed C whenever possible.

Similarly, if the initial link width/speed of PCI express bus is link A/B 100, and the link width/speed stored in a register by a software application is link D/B, the software-directed width change will be executed. Link width A will be changed to link width D as a result of negotiation between two ends of the bus (North bridge and Graphic Chip). Once the target link width D passes subsequent failure width management 126 and unreliable width management 128, the link width/speed of PCI express bus will be finally changed to link D/B 160, and the link is supposed to attain target link width D whenever possible.

Figure 4:
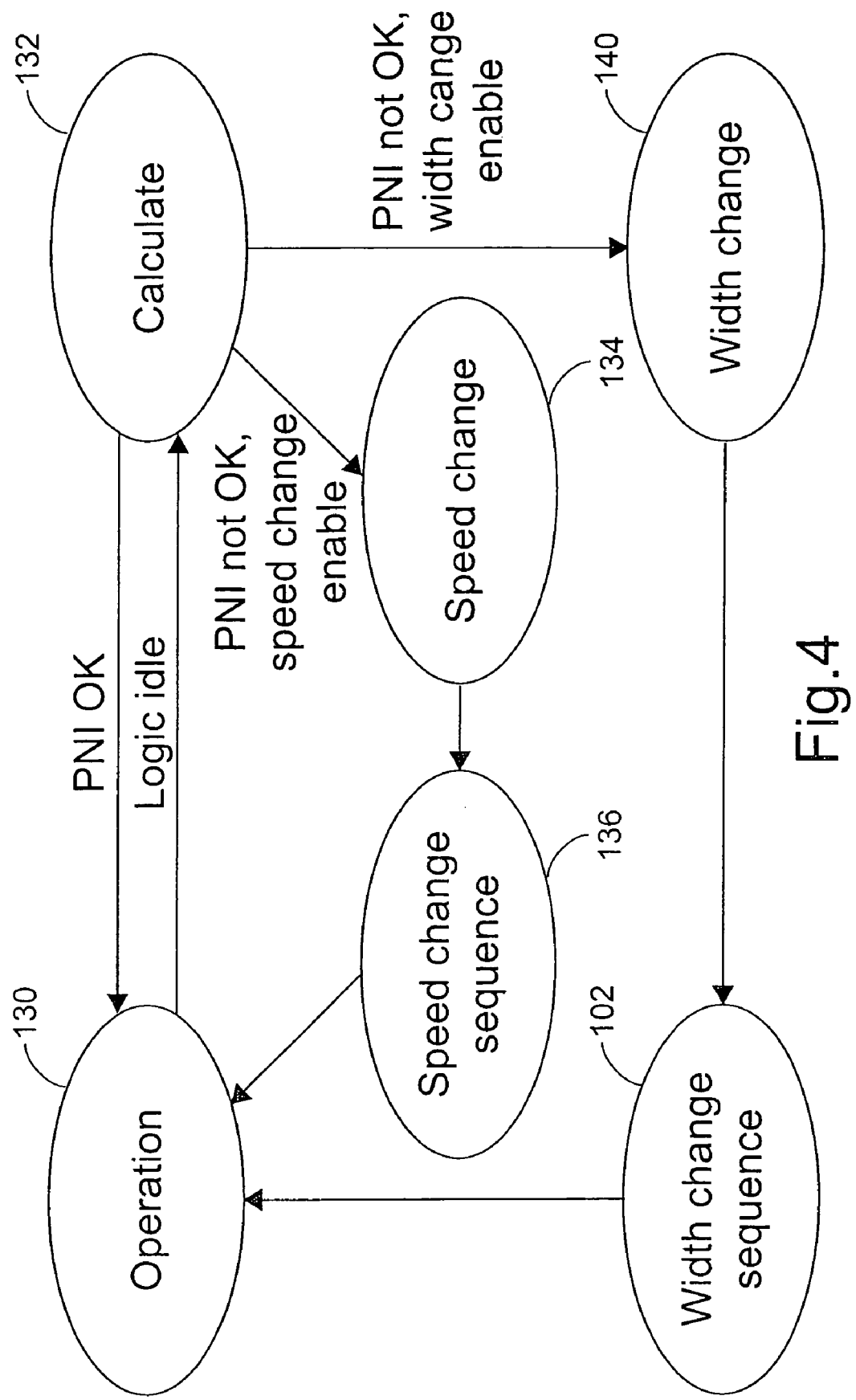
FIG. 4 is a scheme illustrating a logic idle calculation based on a hardware autonomous bandwidth mechanism according to an embodiment of the present invention.

FIG. 4 depicts a state diagram schematically illustrating the hardware autonomous change according to an embodiment of the present invention. In operation state 130, a north bridge chip monitors a logic idle symbol and counts the number of continuous logic idle symbols in a transmitter and a receiver of the north bridge chip. If the continuous logic idle symbol number is greater than a first programmable limit, the north bridge chip will enter calculate state 132.

In calculate state 132, north bridge chip periodically monitors its logic idle symbol at the most busy lane in a multi-lane link (lane 0 or starting lane) and calculates a percentage of non-logic idle (PNI) to indicate link bandwidth behaviors. That PNI is OK means packet traffic is acceptable with the current link bandwidth, and the link bandwidth has no need to change. That PNI is too high means traffic is busy, and the link bandwidth needs upgrade. That PNI is too low means traffic is little, and the link bandwidth needs downgrade. For example, when PNI is greater than a second programmable value of 87.5%, the link bandwidth needs to be upgraded. When PNI is lower than a third programmable value of 12.5%, the link bandwidth needs to be downgraded. When PNI is lower than 87.5% and greater than 12.5%, it means PNI is OK and there is no need to change the link bandwidth. Therefore, the state changes from calculation state 132 to operation state 130.

When PNI is too high or too low based on above method, either a speed or width change needs to be executed. The north bridge chip may enter speed change state 134 of the bus for negotiating a target speed, and then enter speed change sequence state 136 for setting a target speed; or the north bridge chip may enter width change state 140 of the bus for negotiating a target width, and then enter width change sequence state 142 of the bus for setting a target width. After link speed or link width is changed, the north bridge chip moves back to operation state 130 of the bus with a new link bandwidth.

Figure 5:
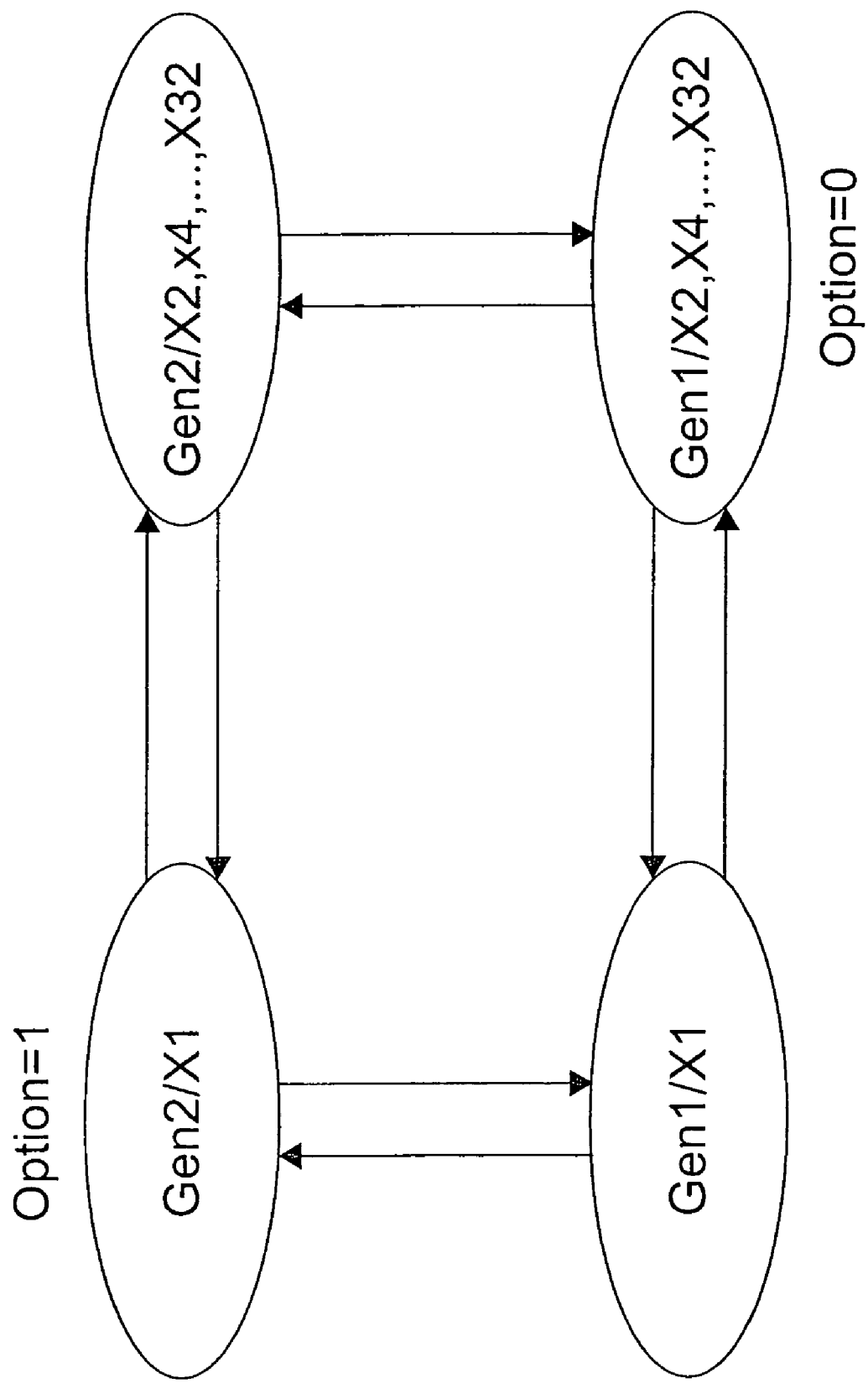
FIG. 5 is a scheme illustrating a hardware autonomous bandwidth negotiation priority varying with an option according to an embodiment of the present invention.

In addition, whether speed change state 134 or width change state 140 is carried on first is based on hardware autonomous bandwidth negotiation priority as depicted in FIG. 5. When an option is set to 1, speed negotiation priority is higher; when the option is set to 0, width negotiation priority is higher. For example, if the option is set to 1, link Gen 1/x1 will be upgraded to link Gen 2/x1 first, and then the width will be upgraded from x1 to x2, x4 . . . x32, if necessary; link Gen 2/x32 will be downgraded to link Gen 2/x32 . . . x1 first, and then the speed will be downgraded to Gen 1, if necessary. Here the option can be seen as power consumption option of a link, where a wider link consumes more power than a higher speed link with a half width.

Similarly, if the option is set to 0, the width of link Gen 1/x1 will be upgraded to link Gen 1/x2 . . . x32 first, and then the speed will be upgraded Gen 2/x2 . . . x32, if necessary. If the option is set to 1, the speed of link Gen 2/x2 . . . x32 will be downgraded to link Gen 1/x2 . . . x32 first, and then the width will be downgraded to Gen 1/x1, if necessary.

Please refer again to FIG. 3. Hardware autonomous change 106 includes hardware speed change 108 and hardware width change 120. After hardware speed change 108 is completed, Link A/B 100 will be changed to target Link A/C 150 if speed C passes subsequent failure speed management 110 and unreliable speed Management 112. Similarly, after hardware width change 120 is completed, Link A/B 100 will be changed to target Link D/B 160 if speed C passes subsequent failure width management 126 and unreliable speed management 128.

Figure 6:
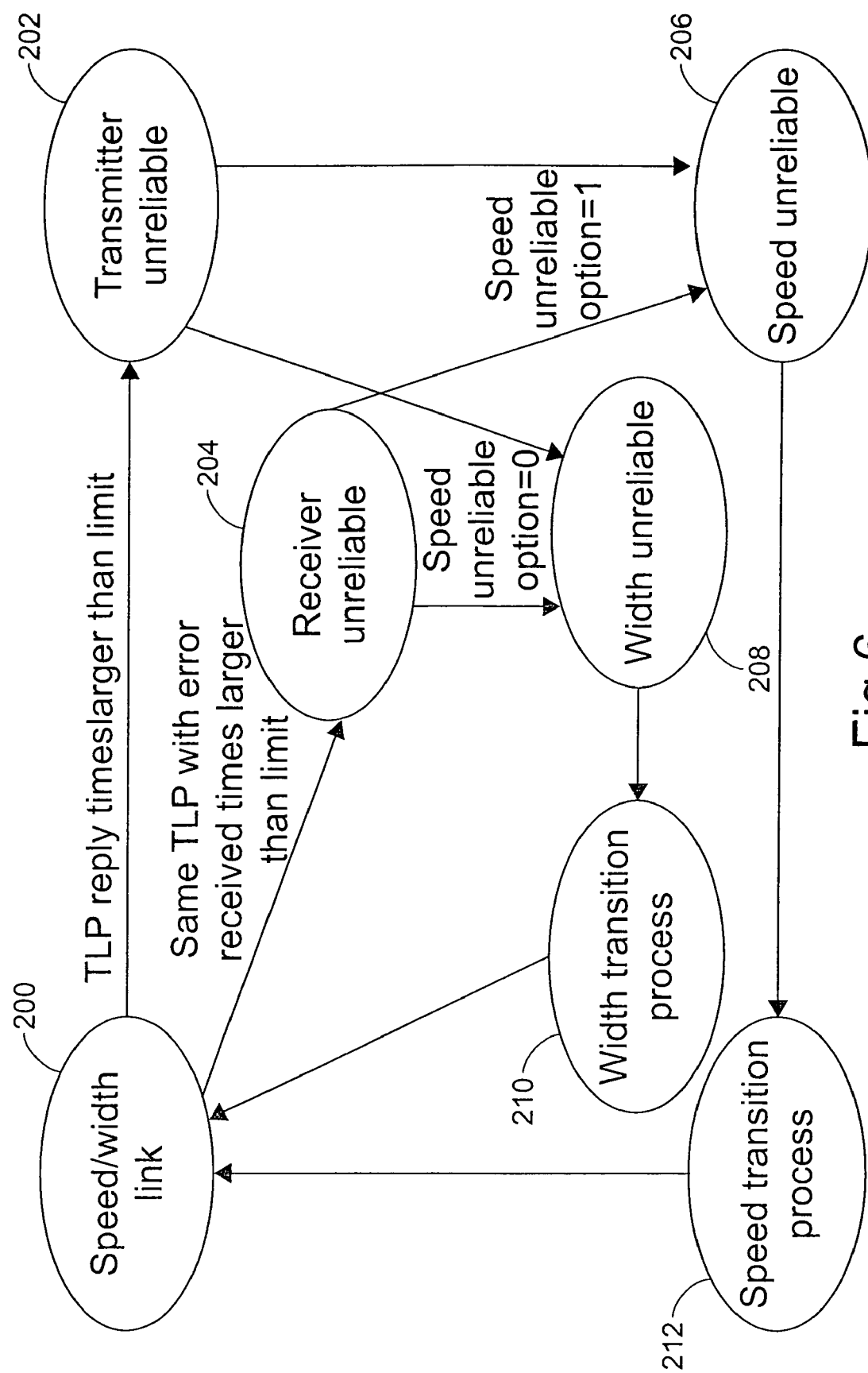
FIG. 6 is a scheme illustrating a link unreliable management process according to an embodiment of the present invention.

FIG. 6 depicts a state diagram illustrating the unreliable change of the present invention. When the PCI express bus operates at specified link width/speed 200, if same TLP (Transition Layer Packet) has been resent several times exceeding a limit (a fourth programmable value) by a transmitter and still fails to be ACKed (Acknowledged) by a receiver, the transmitter will be defined as transmitter unreliable 202; If the receiver gets the same sequence number TLP and CRC (Cycle Redundancy Check) error case several times exceeding a limit (a fifth programmable value), the receiver will be defined as receiver unreliable 204. Either transmitter unreliable 202 or receiver unreliable 204 can be seen as an unreliable link bandwidth.

Since a bandwidth is defined with both a link speed and a link width, when a specific bandwidth is unreliable, it cannot say if the link speed is too high, or the link width is too large. Here another option (speed unreliable option) is added. When the speed unreliable option is 0, transmitter unreliable 202 or receiver unreliable 204 will enter width unreliable state 208, and then enter width transition process state 210 for changing link width. Then the PCI express bus will operate at the new link width. When the speed unreliable option is 1, transmitter unreliable 202 or receiver unreliable 204 will enter speed unreliable state 206, and then enter speed transition process state 212 for changing link speed. Then the PCI express bus will operate at the new link speed.

Please again refer to FIG. 3. If unreliable speed change 120 is happening, the PCI express bus with Link A/B 100 will change to Link A/C 150 if the speed C passes subsequent failure speed management 110 and unreliable speed management 112. Similarly, if unreliable width change 124 is happening, PCI express bus with Link A/B 100 will change to Link D/B 160 if the width D passes subsequent failure width management 126 and unreliable width management 128.

Please again refer to FIG. 3. Based on failure speed management 110 and failure width management 126, if initial link width/speed fails to operate at the negotiated target width/speed, the PCI express bus will remain at the initial width/speed. The failed width/speed will be recorded, and either software or hardware speed transition to that bandwidth is unattainable. Similarly, based on unreliable speed management 112 and unreliable width management 128, if the target link width/speed is detected as an unreliable link width/speed, the PCI express bus will remain at the initial width/speed. The unreliable width/speed will be recorded, and either software or hardware speed transition to that bandwidth is unattainable.

By introducing the method of link bandwidth management, this invention can resolve the problems of prior art. Different link bandwidths can be set for different applications, which can help to achieve both good performance and power saving. Another problem resolved is that, for bandwidth change, there is no need to enter link down state, or device re-initialization/configuration state. Therefore, the transition time between different bandwidths is much shortened.

The present invention is intended to cover various modifications and similar arrangements included to within the spirit and scope of the appended claims, which are to be accorded with the broadest interpretation so as to encompass all such modifications and similar structures.

What is claimed is:

1. A method for link bandwidth management between two devices in communication through a bandwidth-adjustable bus in a computer system, comprising:
    monitoring whether a change condition of said bus having a link is activated;
    determining which of a speed negotiation priority and a width negotiation priority is higher when said change condition is activated;
    changing an original width of said bus to a target width first while remaining at an original speed of said bus unchanged when said width negotiation priority is higher, and then optionally changing said original speed to a target speed;
    changing said original speed of said bus to said target speed first while remaining at said original width of said bus unchanged when said speed negotiation priority is higher, and then optionally changing said original width to said target width; and
    causing said bus to operate at a target bandwidth with said target width and said target speed without disabling said link or powering down said computer system.

2. The method according to claim 1, wherein said bus is a PCI express bus.

3. The method according to claim 1, wherein selectable widths of said link include 1-lane width, 2-lane width, 4-lane width, 8-lane width, 16-lane width and 32-lane width, and selectable speeds of said link include a generation 1 speed having a clock data rate of 2.5 GHz and a generation 2 speed having a clock data rate of 5 GHz.

4. The method according to claim 1, wherein said two devices are a north bridge chip and a graphic chip.

5. The method according to claim 1, further comprising if said bus has failed to operate at said target bandwidth, causing said bus to remain operating at said original width and speed and recording said target bandwidth as an unattainable bandwidth.

6. The method according to claim 1, further comprising if said bus operates at said target bandwidth and said target bandwidth is unreliable, causing said bus to remain operating at said original width and speed and recording said target bandwidth as an unattainable bandwidth.

\* \* \* \* \*